United States Patent
Keeney et al.

(10) Patent No.: US 8,025,944 B2
(45) Date of Patent: *Sep. 27, 2011

(54) CUT AND STACK LABELS OF LAMINATED FILM

(75) Inventors: Sean M Keeney, Atlanta, GA (US); Richard D. Evans, Lexington, KY (US)

(73) Assignee: Walle Corporation, New Orleans, LA (US)

( * ) Notice: Subject to any disclaimer, the term of this patent is extended or adjusted under 35 U.S.C. 154(b) by 951 days.

This patent is subject to a terminal disclaimer.

(21) Appl. No.: 10/482,539

(22) PCT Filed: Jun. 27, 2002

(86) PCT No.: PCT/US02/20585
§ 371 (c)(1),
(2), (4) Date: Jul. 20, 2004

(87) PCT Pub. No.: WO03/002839
PCT Pub. Date: Jan. 9, 2003

(65) Prior Publication Data
US 2004/0247884 A1 Dec. 9, 2004

Related U.S. Application Data

(60) Provisional application No. 60/301,768, filed on Jun. 28, 2001.

(30) Foreign Application Priority Data

| Oct. 4, 2001 | (JP) | 2001-309004 |
| Sep. 27, 2002 | (JP) | 2002-51835 |

(51) Int. Cl.
*B32B 9/00* (2006.01)

(52) U.S. Cl. ...... 428/40.1; 428/343; 428/354; 428/42.1; 428/34; 428/207

(58) Field of Classification Search ........... 428/40.1, 428/343, 354, 42.1, 34, 207
See application file for complete search history.

(56) References Cited

U.S. PATENT DOCUMENTS

| 3,740,248 | A |   | 6/1973  | Buhler et al. ........... 428/403 |
| 4,055,452 | A | * | 10/1977 | Carlisle ................. 156/251 |
| 5,151,309 | A |   | 9/1992  | Dollinger |
| 5,468,535 | A |   | 11/1995 | Amano et al. |
| 5,478,616 | A | * | 12/1995 | Kochem et al. ......... 428/35.2 |
| 5,486,253 | A |   | 1/1996  | Otruba ................. 156/215 |
| 5,709,937 | A |   | 1/1998  | Adams et al. |
| 5,897,722 | A | * | 4/1999  | Bright ................... 156/86 |
| 5,904,974 | A |   | 5/1999  | Hanada et al. |
| 6,060,137 | A | * | 5/2000  | Akao .................... 428/35.2 |
| 6,106,982 | A | * | 8/2000  | Mientus et al. ........... 430/14 |
| 6,302,994 | B1| * | 10/2001 | Kamiya et al. .......... 156/320 |
| 6,756,095 | B2| * | 6/2004  | Sandt et al. ........... 428/40.1 |
| 2004/0109997 | A1 | * | 6/2004 | Li et al. .............. 428/354 |
| 2005/0008809 | A1 | * | 1/2005 | Miller et al. .......... 428/40.1 |

* cited by examiner

*Primary Examiner* — Betelhem Shewareged
(74) *Attorney, Agent, or Firm* — King & Schickli, PLLC

(57) ABSTRACT

A cut and stack label includes a layer of polymer film printing stock having a first face carrying a printed message and a second, opposite face, a clear polymer film laminated to the first face over that printed message and a coating of an antistatic formulation over the clear polymer film and/or the second face. An optional dusting or layer of offset powder may also be provided.

18 Claims, 1 Drawing Sheet

CUT AND STACK LABELS OF LAMINATED FILM

This application is a 371 of PCT/US02/20585 filed Jun. 27, 2002 which claims the benefit of U.S. Provisional Patent Application Ser. No. 60/301,768 filed Jun. 28, 2001.

TECHNICAL FIELD

The present invention relates generally to the product labeling field and, more particularly, to a laminated polymer film label having sufficient stiffness and anti-static properties to run in existing cut and stack labeling equipment as well as a method for the production of such a label.

BACKGROUND OF THE INVENTION

There is a growing consumer preference for food, beverage and household products packaged in plastic containers. This is because plastic containers offer the consumer a number of convenient benefits including, but not limited to, portability, resealability, safety, light weight and contourability for a comfortable grip.

Plastic containers, however, pose several challenges for packaged goods companies and label manufacturers. One of the main reasons for this is that plastic containers are particularly durable and can withstand more demanding consumer environments, such as an ice chest, as well as withstand a drop to the ground of perhaps six feet or more. Further, a plastic container's portability means it can be used and the product consumed over a long period of time including days or weeks, not hours.

For label manufacturers, this means packaged goods companies prefer labels to be 100% waterproof, 100% scuff-proof, extremely durable, resistant to scuffing and product deterioration, able to withstand drops of six feet or more without tearing and be aesthetically pleasing to the consumer's eye and touch for the life of the use of the plastic container. Unfortunately, no state of the art label capable of use with existing cut and stack labeling equipment offers all of these desired performance features in a cost effective manner.

State of the art label solutions for plastic containers generally fall into four categories, poly/paper, poly/poly, aqueous coated synthetic and ultraviolet (UV) coated synthetic. An example of a state of the art poly/paper label is a lightweight clear polypropylene film laminated to C1S paper. The clear polypropylene film provides an attractive high gloss appearance. The film lamination also provides durability for scuff protection and passing drop tests. Due to its incorporation of a paper layer, however, the poly/paper label is not waterproof. Accordingly, when subjected to humid or wet environments, the label has a tendency to curl and/or to deteriorate.

An example of a poly/poly label is a lightweight clear polypropylene film laminated to a lightweight white opaque polypropylene film printing stock. The clear polypropylene film provides an attractive high gloss appearance and durability for scuff protection and passing drop tests. The 100% film nature of the construction provides the label with 100% waterproof properties. However, poly/poly labels are available only in roll fed label form and thus are limited to use by packaged goods companies that own and/or operate roll fed labeling equipment. As presently manufactured, poly/poly labels are not stiff enough and lack sufficient anti-static properties to run in existing cut and stack labeling equipment.

An example of an aqueous coated synthetic label is a single layer heavyweight bright white polypropylene film that is aqueous coated. The 100% film nature of the construction provides the label with 100% waterproof properties. However, an aqueous coated synthetic label does not have the high gloss appearance or scuff resistance properties of laminated labels and, accordingly, does not provide a complete answer to the needs of the packaged goods manufacturer.

An example of a UV coated synthetic label is a single layer of heavyweight bright white polypropylene film printing stock that is ultraviolet coated. Again, the 100% film nature of the construction provides the label with 100% waterproof properties. While the UV coated synthetic label does have a higher gloss appearance and improved scuff and product resistance properties when compared to an aqueous coated synthetic label due to the use of an ultraviolet coating, it does not offer the same degree of gloss and scuff protection as the film lamination label. This shortcoming along with the high cost of ultraviolet inks and coatings means that UV coated synthetic labels also fail to meet all the needs of the packaged goods manufacturer.

A need is therefore identified for an improved label for packaged goods manufacturers that provides all the desired properties in a cost effective label that is stiff enough and has sufficient anti-static properties to reliably and efficiently run in existing cut and stack labeling equipment.

SUMMARY OF THE INVENTION

In order to achieve the foregoing and in accordance with the purposes of the present invention as described herein, an improved cut and stack label is provided. That label comprises a layer of polymer film printing stock having a first face carrying a printed message and a second, opposite face. A clear polymer film is laminated to the first face of the polymer film printing stock over the printed message. Additionally, a coating of an anti-static formulation is provided over the clear polymer film and/or over the second face.

Still further describing the invention, the label includes a layer of adhesive between the clear polymer film and the layer of polymer film printing stock. The layer of polymer film printing stock may be made from a material selected from a group consisting of polypropylene, polyethylene, polystyrene, polyvinyl chloride, polyethylene terephthalate, polytetrafluoroethylene, polyvinylidene fluoride, polyvinylidene chloride, polyester, nylon, mineral enhanced polymer and mixtures thereof. The polymer film printing stock may also be opaque, clear, hologram or metallized. The polymer film printing stock may be white, black or any other appropriate color that might be selected for marketing purposes. The layer of polymer film printing stock has a thickness of at least 0.5 mil and typically between 0.5 mil and 4.0 mil in order to provide the desired stiffness for use in existing cut and stack labeling equipment.

The clear polymer film is made from a material selected from a group consisting of polypropylene, polyethylene, polystyrene, polyvinyl chloride, polyethylene terephthalate, polytetrafluoroethylene, polyvinylidene fluoride, polyvinylidene chloride, polyester, nylon and mixtures thereof. The clear polymer film generally has a thickness of between about 0.5 mil-4.0 mil in order to provide the necessary stiffness, durability and scuff protection to protect the printing on the printing stock to which the clear polymer film is laminated.

The anti-static formulation generally comprises by weight percent from about 2.0-6.0% anti-static agent, 0-3.0% slip agent/wax, 0-0.3% defoamer and the remainder is solvent. Preferably the solvent is water, alcohol (e.g. isopropyl alcohol) or a mixture thereof.

The label may also include an optional dusting or layer of offset powder to further aid in preventing stacked labels from sticking together. The offset powder may be applied directly to the clear polymer film when the coating of anti-static formulation is only applied to the second face, directly to the second face when the coating of anti-static formulation is only applied to the clear polymer film over the first face or directly over the coating of anti-static formulation on either or both faces. The offset powder may be any powder that functions as a lubricant and aids in separating the stacked labels so as to insure proper and efficient labeling machine operation. Cornstarch is one suitable offset powder.

In accordance with yet another aspect of the present invention, a method of producing cut and stack labels from a web of polymer film printing stock is provided. That method includes the step of applying ink to a first face of the polymer film printing stock. Additionally, the method includes the steps of laminating a clear polymer film to the first face of the polymer film printing stock over the ink. Still further the method includes the steps of coating the clear polymer film and/or a second, opposite face of the polymer film printing stock with an anti-static formulation and cutting individual labels from the laminated printing stock. In addition, the method may include the step of applying an offset powder to the clear polymer film, the second face of the polymer film printing stock or the anti-static formulation over either of those faces.

Still other benefits and advantages of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
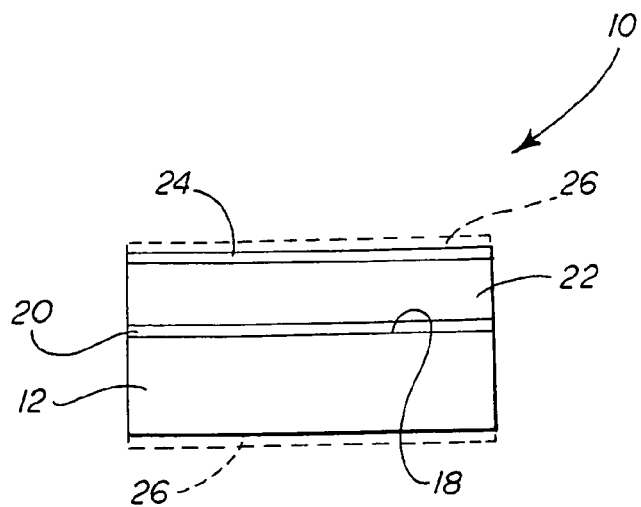
FIG. 1 is a schematical edge elevational view of a label constructed in accordance with the teachings of the present invention.

Reference is now made to drawing FIG. 1 clearly illustrating the label 10 of the present invention. That label 10 comprises a layer of polymer film printing stock 12 which may be constructed from polypropylene, polyethylene, polystyrene, polyvinyl chloride, polyethylene terephthalate, polytetrafluoroethylene, polyvinylidene fluoride, polyvinylidene chloride, polyester, nylon, mineral enhanced polymer and any mixture thereof. Preferably the polymer film printing stock 12 has a thickness of at least 0.5 mil and more typically between 0.5 mil-4.0 mil in order to provide the necessary stiffness to allow the label 10 to be used in existing cut and stack labeling equipment. The polymer film printing stock 12 may be opaque. Of course, other alternatives are possible including but not limited to clear, hologram and metallized. The polymer film printing stock 12 could be white, black or any other color which might be desired by a product packager.

A first face 18 of the polymer film printing stock 12 carries a message printed in ink or other means suitable for application to the printing stock. A clear drying adhesive layer 20 is applied to the printed face 18 of the printing stock 12 and/or the back side of a clear polymer film 22 and the clear polymer film is laminated to the printing stock 12 by the setting adhesive. The clear polymer film 22 may be made from polypropylene, polyethylene, polystyrene, polyvinyl chloride, polyethylene terephthalate, polytetrafluoroethylene, polyvinylidene fluoride, polyvinylidene chloride, polyester, nylon and mixtures thereof. Typically the clear polymer film 22 is provided in a thickness of between 0.5 mil-4.0 mil. Together, the polymer film printing stock 12 and the clear polymer film 22 are of a sufficient thickness and strength to provide the necessary stiffness to help support operation in existing cut and stack labeling equipment. Additionally, the clear polymer film 22 provides the desired durability and scuff protection to protect the message printed on the face 18 of the printing stock 12 from damage during packaging, shipping, sale, and use by the consumer.

If desired, a cold glue receptive coating may be applied to the back side or second face of the printing stock 12 before the application of inks and lamination. The coating is a water-based polymeric coating that is cured by evaporative drying. The coating improves drying during the application of the cold glue label adhesive. An example of such a coating is available from RoyMal, Inc. of Newport, N.H.

A first anti-static coating 24 is provided on the exposed face of the clear film 22. The first anti-static coating 24 has a formulation comprising from about 2.0-6.0% anti-static agent (e.g. Armac 1019, available from Akzo Nobel Surface Chemistry, LLC of Chicago, Ill.), 0-3.0% slip agent/wax (e.g. PBI-19559, available from Flint Ink of Atlanta, Ga.), 0-0.3% defoamer and the remainder is solvent. This solvent may be selected from a group consisting of water, alcohol and any mixture thereof. A typical alcohol utilized as a solvent in an anti-static formulation of the type being described is isopropyl alcohol. In accordance with yet another aspect of the invention, an optional offset powder dusting or layer 26 may be applied to the clear polymer film 22 over the first anti-static coating 24 and/or directly to the second face of the printing stock 12. The offset powder dusting or layer 26 may be substantially any powder exhibiting the desired lubricating properties so as to aid in separating the individual stacked labels so that they may be fed easily through the labeling machine. One useful offset powder is cornstarch. For example, #375 coated 30 micron powder available from Oxy-Dry of Itasca, Ill., may be utilized as the offset powder.

The anti-static coating 24 (and the optional offset powder layer 26 when used) on the upper face of the label 10 provide sufficient lubricating and anti-static properties to allow ready separation of stacked labels 10 in existing cut and stack labeling equipment. Thus, the labels 10 have the necessary stiffness and anti-static properties to operate efficiently and reliably in existing cut and stack labeling equipment. Further, the labels 10 beneficially provide the properties desired by packaged goods manufacturers utilizing plastic containers. Specifically, the labels 10 are 100% waterproof, extremely durable by being resistant to scuffing and product deterioration and able to withstand drops of six feet or more without tearing, and are aesthetically pleasing to the consumer's eye and touch for the foreseeable useful life of the container. Further, the labels 10 may be manufactured in a cost effective manner competitive in today's marketplace.

Figure 2:
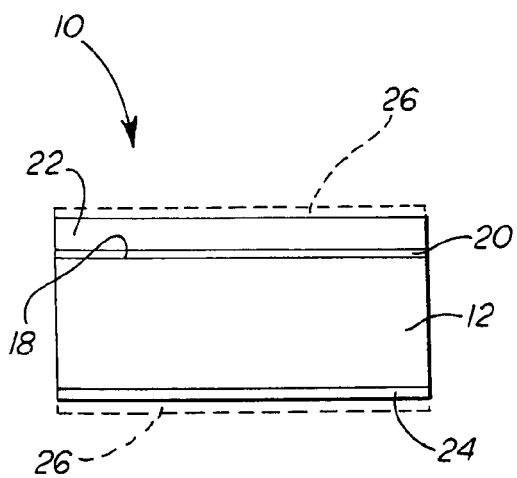
FIGS. 2-3 are illustrations of alternative embodiments similar to FIG. 1.
Figure 3:
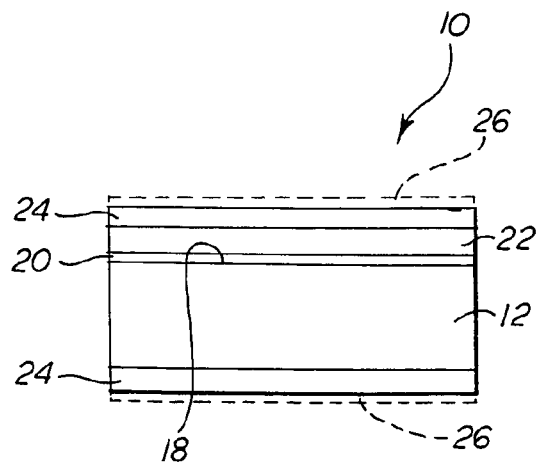

Alternative embodiments of the present invention are illustrated in FIGS. 2 and 3. In the FIG. 2 embodiment, the anti-static coating 24 is provided on the second face of the polymer film printing stock 12 opposite the printed face 18. The optional offset powder 26 may be provided (a) on the first, printed face 18 directly over the clear polymer film 22, (b) on the second face directly over the anti-static coating 24, (c) on both of these faces or (d) on neither face.

In the FIG. 3 embodiment, an anti-static coating 24, 24' is provided over both faces. The optional offset powder 26 may be provided (a) on the first printed face 18 over the anti-static coating 24 overlying the clear polymer film 22, (b) on the second face directly over the anti-static coating 24', (c) on both faces or (d) on neither face.

A method of producing cut and stack labels from a web of polymer film printing stock in accordance with the present invention may be generally described as including the steps of: (a) applying ink to a first face of the polymer film printing stock or the back side of a clear polymer film; (b) laminating the clear polymer film to the first face of the polymer film printing stock; (c) coating the clear polymer film and/or a second, opposite face of said polymer film printing stock with an anti-static formulation; and (d) cutting individual labels from the laminated printing stock. Additionally, the method may also include the step of (e) applying an offset powder. As illustrated in FIGS. 1-3, that offset powder 26 may be applied over the coating 24 of anti-static formulation on either or both faces, directly to the clear polymer film 22 when that film is not covered by an anti-static coating or directly to the second face of the polymer film printing stock 12 when that face is not covered by an anti-static coating.

More specifically describing the production method of the embodiment illustrated in FIG. 1, pre-press stage steps include making the printing plates, printing inks and selecting the polymer film for the printing stock.

The printing press stage steps include feeding the polymer film printing stock in web form into the printing press. Specifically, as is known in the art, the printing press is composed of a feeding unit for feeding stock into the press, a number of print units and a delivery unit for delivering printed stock out of the press. Each print unit consists of (a) a number of printing cylinders for feeding the printing stock through the press, for applying ink to the printing plate and for transferring ink to the front face of the stock or the back side of the clear polymer film and (b) a drying and/or curing unit that dries the ink, coating or adhesive utilizing either hot air drying or ultraviolet curing.

At the first and each subsequent printing unit, ink of particular color is applied to the first or print face 18 of the polymer film printing stock 12 or the back side of the clear polymer film utilizing the printing plate. Through the application of ink at each printing unit, the printed image of the label is created.

At the second to last printing unit, an ultraviolet activated adhesive 20 is applied with a rubber roller to the first face 18 of the printing stock 12 over the printed image. The polymer film printing stock 12 is then nipped to a web of clear polymer film 22 that is fed into the printing press for laminating to the printing stock. Following the nip, an ultraviolet lamp cures the ultraviolet adhesive 20 through the clear film 22 while the printing stock 12 moves over a chilling roll to control the temperature of the stock. At the last printing unit, a coating 24 of an anti-static formulation is applied over the exposed face of the clear polymer film 22 utilizing a rubber roller. This coating 24 may be rapidly dried by air circulation or other means if desired.

Next, a powder unit applies an offset powder layer 26 to the clear polymer film 22 over the anti-static coating 24. This offset powder dusting or layer 26 aids in the in-line sheeting operation and the subsequent feeding of individual labels in the label applying equipment.

Next, the laminated printing stock is delivered, still in web form into a delivery unit. The delivery unit cuts the stock into individual sheets with multiple labels 10 on each sheet. These sheets are then delivered onto a series of skids. Each skid of sheets moves to a post-press stage for final finishing of the label.

The post-press stage steps of the manufacturing process require each skid of sheets to be jogged, inspected, separated into increments of 1000 sheets, cut, banded and packaged in a box. The sheets are jogged on a jogging machine that vibrates the sheets so that the sheets are aligned to each other for accurate cutting. At the jogging machine separation of the sheets into lift counts of 1000 sheets is determined using a weighing scale.

After jogging, the lift of 1000 sheets is transferred via air tables to a cutting machine that cuts the 1000 sheets into bundles of 1000 individual labels 10. After the cutting machine, the bundle of 1000 individual labels 10, now in cut and stack form, are packaged together and placed in a box for storage and shipment. A bundle of labels 10 can be packaged in a number of ways including banded, string tied or shrink wrapped.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, a cold glue receptive coating could be applied to the back side of the printing substrate before the application of inks and lamination. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A cut and stack label, comprising:
   a layer of polymer film printing stock having a first face directly printed with a message and a second, opposite face;
   a clear polymer film laminated to said first face of said polymer film printing stock over said printed message;
   a coating of an antistatic formulation over said clear polymer film and/or over said second face; and
   a dusting of offset powder applied to at least one exposed face of said cut and stack label.

2. The label of claim 1 including a layer of adhesive between said clear polymer film and said layer of polymer film printing stock.

3. The label of claim 1, wherein said layer of polymer film printing stock is made from a material selected from a group consisting of polypropylene, polyethylene, polystyrene, polyvinyl chloride, polyethylene terephthalate, polytetrafluoroethylene, polyvinylidene fluoride, polyvinylidene chloride, polyester, nylon, mineral enhanced polymer and mixtures thereof.

4. The label of claim 1, wherein said polymer film printing stock is opaque.

5. The label of claim 1, wherein said polymer film printing stock is metallized.

6. The label of claim 1, wherein said polymer film printing stock is clear.

7. The label of claim 1, wherein said clear polymer film is made from a material selected from a group consisting of polypropylene, polyethylene, polystyrene, polyvinyl chloride, polyethylene terephthalate, polytetrafluoroethylene, polyvinylidene fluoride, polyvinylidene chloride, polyester, nylon and mixtures thereof.

8. The label of claim 1, wherein said antistatic formulation comprises in weight percent from about 2.0-6.0% antistatic agent, 0-3.0% slip agent/wax, 0-0.3% defoamer and the remainder solvent.

9. The label of claim 1, wherein said solvent is selected from a group consisting of water, alcohol and a mixture thereof.

10. The label of claim 9, wherein said alcohol is isopropyl alcohol.

11. The label of claim 1, wherein said layer of polymer film printing stock has a thickness of at least 0.5 mil.

12. The label of claim 1, wherein said layer of polymer film printing stock has a thickness of between about 0.5 mil-4.0 mil.

13. The label of claim 1, wherein said clear polymer film has a thickness of between 0.5 mil-4.0 mil.

14. The label of claim 1, wherein said offset powder is cornstarch.

15. A method of producing cut-and-stack labels from a web of polymer film printing stock, comprising:

applying ink directly to a first face of said polymer film printing stock;

laminating a clear polymer film to said first face of said polymer film printing stock over said ink;

coating said clear polymer film and/or a second, opposite face of said polymer film printing stock with an antistatic formulation;

applying an offset powder to at least one exposed face of said web of laminated printing stock; and cutting individual labels from said laminated printing stock.

16. The method of claim 15, further including applying a cold glue receptive coating to an exposed face of said polymer film printing stock.

17. A method of producing cut-and-stack labels from a web of polymer film printing stock, comprising:

applying an ink to a back side of a clear polymer film;

laminating said back side of said clear polymer film directly to a first face of said polymer film printing stock;

coating said clear polymer film and/or a second, opposite face of said polymer film printing stock with an antistatic formulation;

applying an offset powder to at least one exposed face of said web of laminated printing stock; and cutting individual labels from said laminated printing stock.

18. The method of claim 17, further including applying a cold glue receptive coating to an exposed face of said polymer film printing stock.

* * * * *